United States Patent
Metwaly Saad et al.

(10) Patent No.: US 12,376,015 B2
(45) Date of Patent: Jul. 29, 2025

(54) PERCEPTION-ASSISTED WIRELESS COMMUNICATION

(71) Applicant: QUALCOMM Incorporated, San Diego, CA (US)

(72) Inventors: Hussein Metwaly Saad, San Diego, CA (US); Peerapol Tinnakornsrisuphap, San Diego, CA (US); Simone Merlin, San Diego, CA (US); Tom Edward Botterill, San Diego, CA (US); Yann Lebrun, Viroflay (FR); Ravi Agarwal, San Diego, CA (US); Juan Carlos Bucheli Garcia, Lannion (FR); Olufunmilola Omolade Awoniyi-Oteri, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/809,697

(22) Filed: Jun. 29, 2022

(65) Prior Publication Data
US 2023/0146887 A1 May 11, 2023

Related U.S. Application Data

(60) Provisional application No. 63/263,926, filed on Nov. 11, 2021.

(51) Int. Cl.
H04W 48/16 (2009.01)
G01S 5/02 (2010.01)
(Continued)

(52) U.S. Cl.
CPC ......... *H04W 48/16* (2013.01); *G01S 5/02522* (2020.05); *H04W 4/38* (2018.02); *H04W 28/0215* (2013.01); *H04W 72/51* (2023.01)

(58) Field of Classification Search
CPC .............................. H04W 24/08; H04W 24/02
(Continued)

(56) References Cited

U.S. PATENT DOCUMENTS 11,531,912 B2* 12/2022 Geraci .................. G06N 20/00
12,033,006 B1* 7/2024 Nair .......................... G06F 8/61
(Continued)

FOREIGN PATENT DOCUMENTS

WO    WO-2018064627 A1    4/2018
WO    2022187770          9/2022
(Continued)

OTHER PUBLICATIONS

C. Rizopoulos and D. Charitos, "Implications of Theories of Communication and Spatial Behavior for the Design of Interactive Environments," 2011 Seventh International Conference on Intelligent Environments, Nottingham, UK, 2011, pp. 92-99, doi: 10.1109/IE.2011.57 (Year: 2011).*
(Continued)

*Primary Examiner* — William D Cumming
(74) *Attorney, Agent, or Firm* — Harrity & Harrity, LLP

(57) ABSTRACT

A first device may receive, from a second device, perception information for an environment of the first device based at least in part on a perception capability of the second device. The first device may generate a perception associated with a communication by the first device based at least in part on the perception information from the second device, where the perception indicates characteristics of the environment. The first device may adjust a parameter associated with the
(Continued)

communication based at least in part on the perception. Numerous other aspects are described.

30 Claims, 9 Drawing Sheets

(51) Int. Cl.
  *H04W 4/38* (2018.01)
  *H04W 28/02* (2009.01)
  *H04W 72/51* (2023.01)
(58) Field of Classification Search
  USPC .................................................. 370/329, 252
  See application file for complete search history.

(56) References Cited

U.S. PATENT DOCUMENTS

| | | | |
|---|---|---|---|
| 12,061,955 B2* | 8/2024 | Geraci | G06N 20/00 |
| 2016/0300389 A1 | 10/2016 | Glenn, III et al. | |
| 2018/0106618 A1 | 4/2018 | Cerchio et al. | |
| 2019/0238658 A1 | 8/2019 | Shimizu et al. | |
| 2020/0027019 A1 | 1/2020 | Yang et al. | |
| 2020/0241122 A1 | 7/2020 | Achour et al. | |
| 2020/0275402 A1 | 8/2020 | Shi et al. | |
| 2022/0012155 A1* | 1/2022 | Xiao | G06F 11/3447 |
| 2023/0087821 A1* | 3/2023 | Xu | G06N 7/01 706/12 |
| 2023/0124275 A1* | 4/2023 | Pfadler | H04W 24/02 370/252 |
| 2023/0146887 A1* | 5/2023 | Metwaly Saad | H04W 24/08 370/329 |
| 2023/0325711 A1* | 10/2023 | Haraldson | G06N 3/084 706/12 |
| 2023/0370491 A1* | 11/2023 | Crabtree | G06N 3/098 |
| 2024/0061119 A1* | 2/2024 | Gum | G01C 21/3896 |
| 2024/0094382 A1* | 3/2024 | Tapia | G01S 13/931 |
| 2024/0221897 A1* | 7/2024 | Shelton, IV | G16H 20/40 |
| 2025/0048083 A1* | 2/2025 | Metwaly Saad | H04W 24/10 |
| 2025/0071727 A1* | 2/2025 | Kim | H04W 72/21 |

FOREIGN PATENT DOCUMENTS

WO WO-2022193304 A1 * 9/2022
WO WO-2024208205 A1 * 10/2024

OTHER PUBLICATIONS

English translation of WO 2022/193304 Jan. 2025 (Year: 2025).*
International Search Report and Written Opinion—PCT/US2022/075407—ISA/EPO—Nov. 28, 2022.

* cited by examiner

PERCEPTION-ASSISTED WIRELESS COMMUNICATION

CROSS-REFERENCE TO RELATED APPLICATION

This Patent Application claims priority to U.S. Provisional Patent Application No. 63/263,926, filed on Nov. 11, 2021, entitled "PERCEPTION-ASSISTED WIRELESS COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using perception information to assist with wireless communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first device. The method may include obtaining, in particular receiving from a second device, perception information for an environment of the first device, in particular based at least in part on a perception capability of the second device. The method may include generating a perception associated with a communication by the first device based at least in part on the perception information from the second device, where the perception indicates characteristics of the environment. The method may include adjusting a parameter associated with the communication based at least in part on the perception.

Some aspects described herein relate to a method of wireless communication performed by a second device. The method may include obtaining, from one or more sensors of the second device, or one or more sensors associated with the second device, or one or more sensors communicatively coupled with the second device, sensory information associated with an environment of a first device. The method may include generating perception information for the environment of the first device based at least in part on the sensory information, where the perception information is associated with characteristics of the environment. The method may include transmitting the perception information to the first device.

Some aspects described herein relate to a first device for wireless communication. The first device may include a memory and one or more processors coupled to the memory. The one or more processors may be configured to obtain, in particular receive from a second device, perception information for an environment of the first device, in particular based at least in part on a perception capability of the second device. The one or more processors may be configured to generate a perception associated with a communication by the first device based at least in part on the perception information from the second device, where the perception indicates characteristics of the environment. The one or more processors may be configured to adjust a parameter associated with the communication based at least in part on the perception.

Some aspects described herein relate to a second device for wireless communication. The second device may include a memory and one or more processors coupled to the memory. The one or more processors may be configured to obtain, from one or more sensors of the second device, one or more sensors associated with the second device, or one or more sensors communicatively coupled with the second device, sensory information associated with an environment of a first device. The one or more processors may be configured to generate perception information for the environment of the first device based at least in part on the sensory information, where the perception information is associated with characteristics of the environment. The one or more processors may be configured to transmit the perception information to the first device.

Some aspects described herein relate to a non-transitory computer-readable medium that stores a set of instructions for wireless communication by a first device. The set of instructions, when executed by one or more processors of the first device, may cause the first device to obtain, in particular receive from a second device, perception information for an environment of the first device, in particular based at least in part on a perception capability of the second device. The set of instructions, when executed by one or more processors of the first device, may cause the first device to generate a perception associated with a communication by the first device based at least in part on the perception information from the second device, where the perception indicates characteristics of the environment. The set of instructions, when executed by one or more processors of the first device, may cause the first device to adjust a parameter associated with the communication based at least in part on the perception. Some aspects described herein relate to a corresponding computer program.

Some aspects described herein relate to a non-transitory computer-readable medium that stores a set of instructions for wireless communication by a second device. The set of instructions, when executed by one or more processors of the second device, may cause the second device to obtain, from one or more sensors of the second device, one or more sensors associated with the second device, or one or more sensors communicatively coupled with the second device, sensory information associated with an environment of a first device. The set of instructions, when executed by one or more processors of the second device, may cause the second device to generate perception information for the environment of the first device based at least in part on the sensory information, where the perception information is associated with characteristics of the environment. The set of instructions, when executed by one or more processors of the second device, may cause the second device to transmit the perception information to the first device. Some aspects described herein relate to a corresponding computer program.

Some aspects described herein relate to an apparatus for wireless communication. The apparatus may include means for obtaining, in particular receiving from another apparatus, perception information for an environment of the apparatus, in particular based at least in part on a perception capability of the other apparatus. The apparatus may include means for generating a perception associated with a communication by the apparatus based at least in part on the perception information from the other apparatus, where the perception indicates characteristics of the environment. The apparatus may include means for adjusting a parameter associated with the communication based at least in part on the perception.

Some aspects described herein relate to an apparatus for wireless communication. The apparatus may include means for obtaining, from one or more sensors of the apparatus, one or more sensors associated with the apparatus, or one or more sensors communicatively coupled with the apparatus, sensory information associated with an environment of another apparatus. The apparatus may include means for generating perception information for the environment of the other apparatus based at least in part on the sensory information, where the perception information is associated with characteristics of the environment. The apparatus may include means for transmitting the perception information to the other apparatus.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
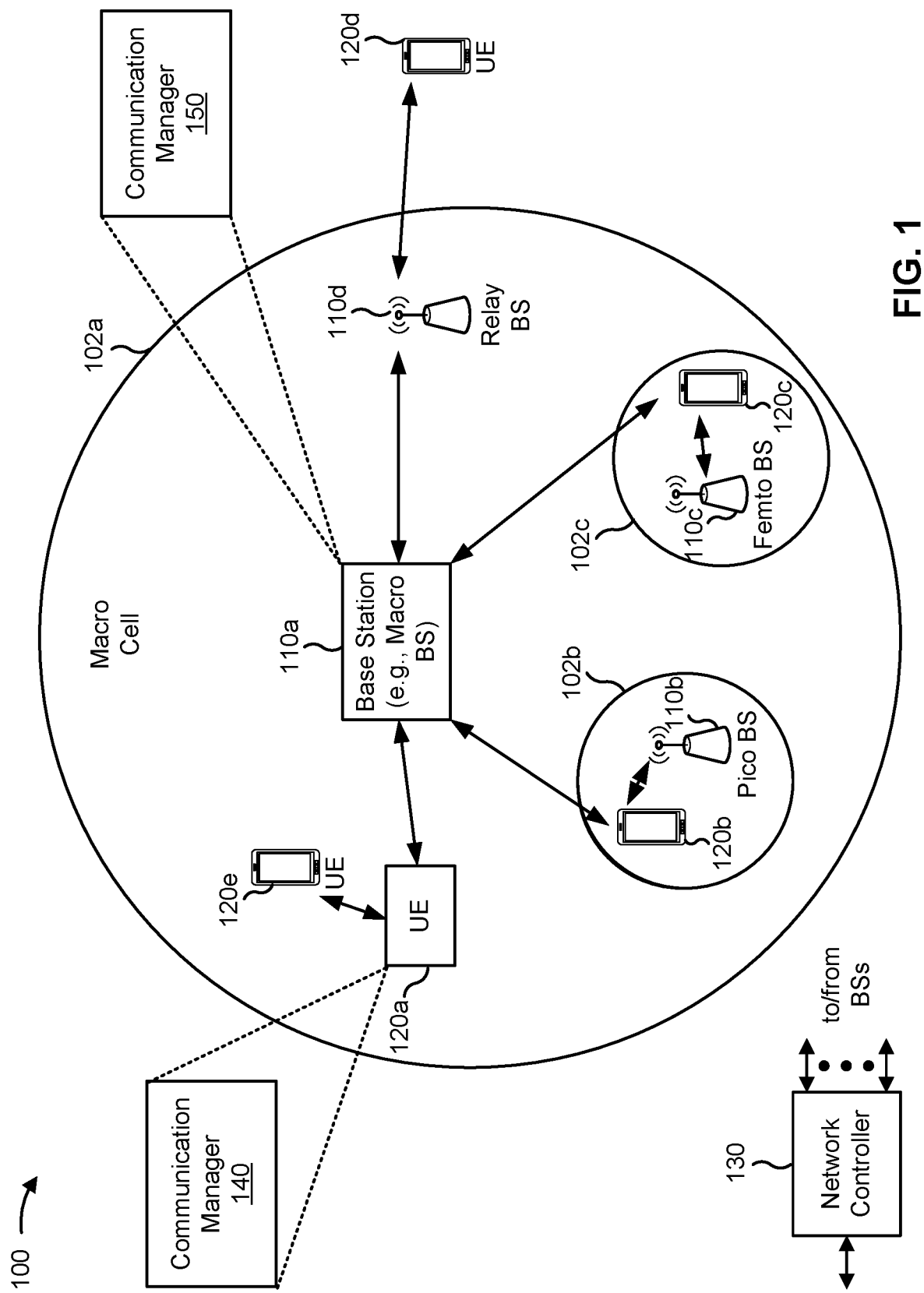
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first device (e.g., a UE 120, base station 110, network processing entity) may include a communication manager 140 or 150. As described in more detail elsewhere herein, the communication manager 140 or 150 may receive, from a second device, perception information for an environment of the first device based at least in part on a perception capability of the second device and generate a perception associated with a communication by the first device based at least in part on the perception information from the second device, where the perception indicates characteristics of the environment. The communication manager 140 or 150 may adjust a parameter associated with the communication based at least in part on the perception. Additionally, or alternatively, the communication manager 140 or 150 may perform one or more other operations described herein.

In some aspects, a second device (e.g., UE 120, base station 110, network processing entity) may include a communication manager 140 or 150. As described in more detail elsewhere herein, the communication manager 140 or 150 may obtain, from one or more sensors of the second device or one or more sensors associated with the second device, sensory information associated with an environment of a first device and generate perception information for the environment of the first device based at least in part on the sensory information, where the perception information is associated with characteristics of the environment. The one or more sensors may be communicatively coupled to the second device. The communication manager 140 or 150 may transmit the perception information to the first device. Additionally, or alternatively, the communication manager 140 or 150 may perform one or more other operations described herein.

As indicated above, FIG. 1 is provided as an example. Other examples may differ from what is described with regard to FIG. 1.

Figure 2:
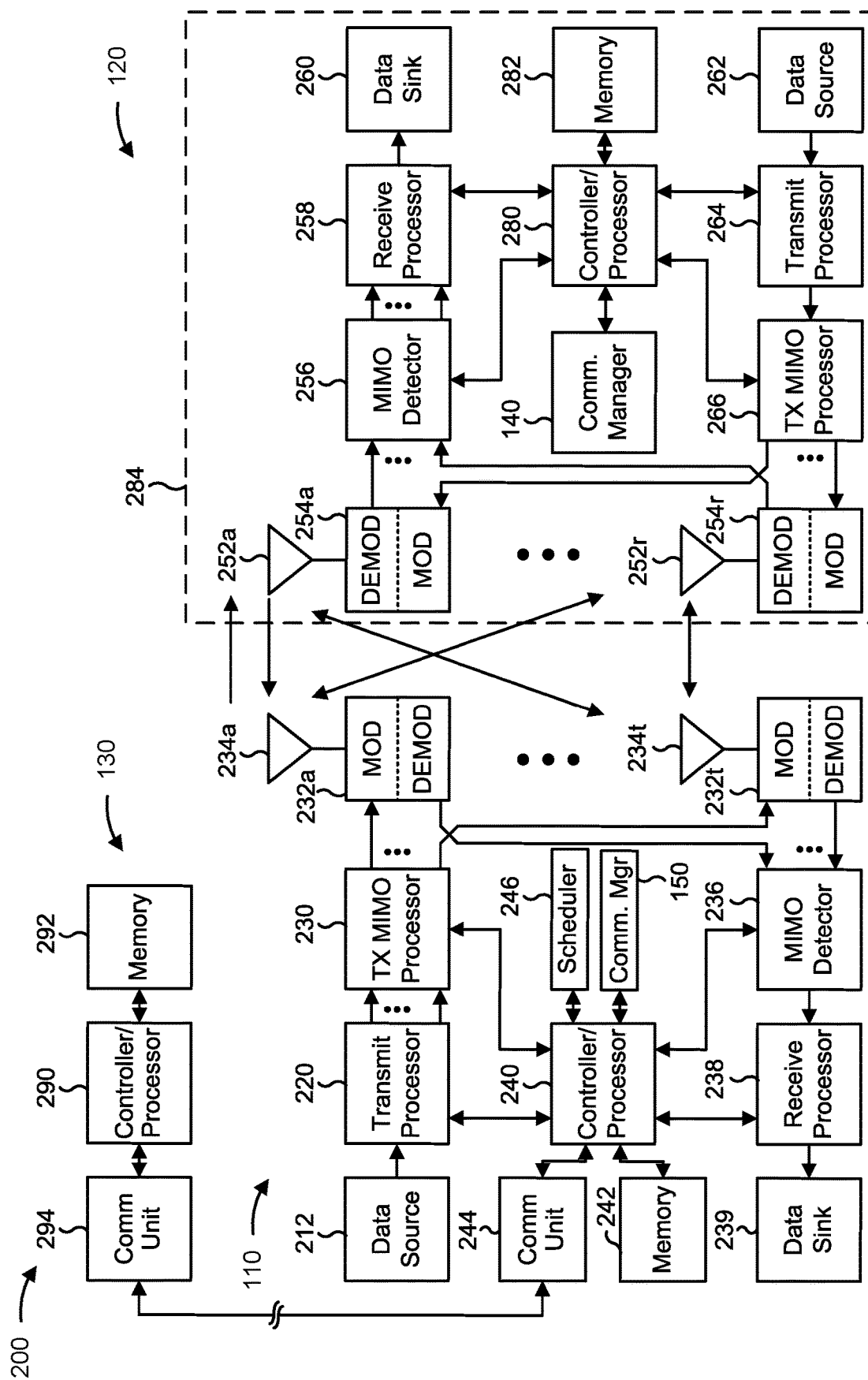
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor

280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with using a perception of the environment to assist with wireless communication, as described in more detail elsewhere herein. A first device may include the UE 120 or the base station 110. A second device may include the base station 110, the UE 120, or a processing entity with a controller/processor. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a first device (e.g., a UE 120, base station 110, network processing entity) includes means for receiving, from a second device, perception information for an environment of the first device based at least in part on a perception capability of the second device; means for generating a perception associated with a communication by the first device based at least in part on the perception information from the second device, where the perception indicates characteristics of the environment; and/or means for adjusting a parameter associated with the communication based at least in part on the perception. In some aspects, the means for the first device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second device (e.g., a UE 120, base station 110, network processing entity) includes means for obtaining, from one or more sensors of the second device or one or more sensors associated with the second device, sensory information associated with an environment of a first device; means for generating perception information for the environment of the first device based at least in part on the sensory information, where the perception information is associated with characteristics of the environment; and/or means for transmitting the perception information to the first device. In some aspects, the means for the second device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the second device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
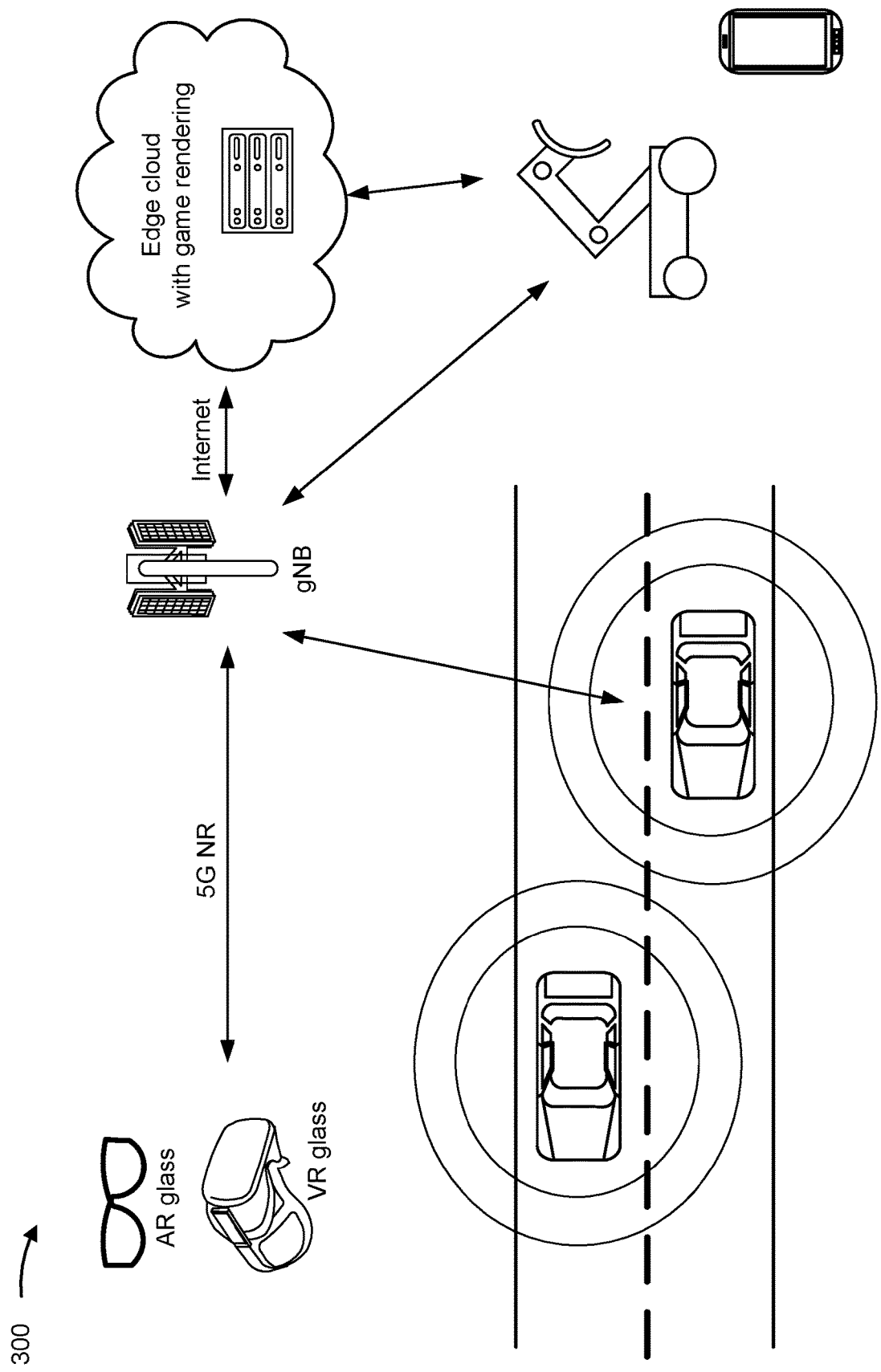
FIG. 3 is a diagram illustrating an example of applications for different environments, in accordance with the present disclosure.

FIG. 3 is a diagram illustrating an example 300 of applications for different environments, in accordance with the present disclosure.

NR applications may include applications for extended reality (XR), which may require low-latency traffic to and from an edge server or a cloud environment. Example 300 shows communications between an XR device and the edge server or the cloud environment, via a base station (e.g., gNB). The XR device may be an augmented reality (AR)

glasses device, a virtual reality (VR) glass device, or a gaming device. The XR device may split computations for an application with the edge server on the other side of a base station. Some NR applications may include V2V, V2I, V2P, or V2X applications for multiple vehicles. Some NR applications may include industrial applications with robots and other individual components.

In NR applications such as these, a base station and a UE may communicate with one another via one or more beams. However, the environment for an NR application may be difficult, with moving vehicles, moving UEs, stationary objects that may block the beams, and/or moving objects that may also block the beams. Beam blocking may result in an abrupt decrease (e.g., below a threshold, such as a noise floor) in the useful signal strength received for the beam and/or adjacent beams in a beam set that includes the beam. This degradation in signal strength may occur across the entire system bandwidth on the beams (e.g., rather than being isolated to one or more frequencies) for a duration of time. This may result in communication errors, such as dropped communications, failed reception, failed demodulation, and/or failed decoding. Frequencies higher than FR2 may be even more susceptible to blocking objects, as well as beam misdirection and path loss.

As indicated above, FIG. 3 is provided merely as an example. Other examples may differ from what is described with regard to FIG. 3.

Figure 4:
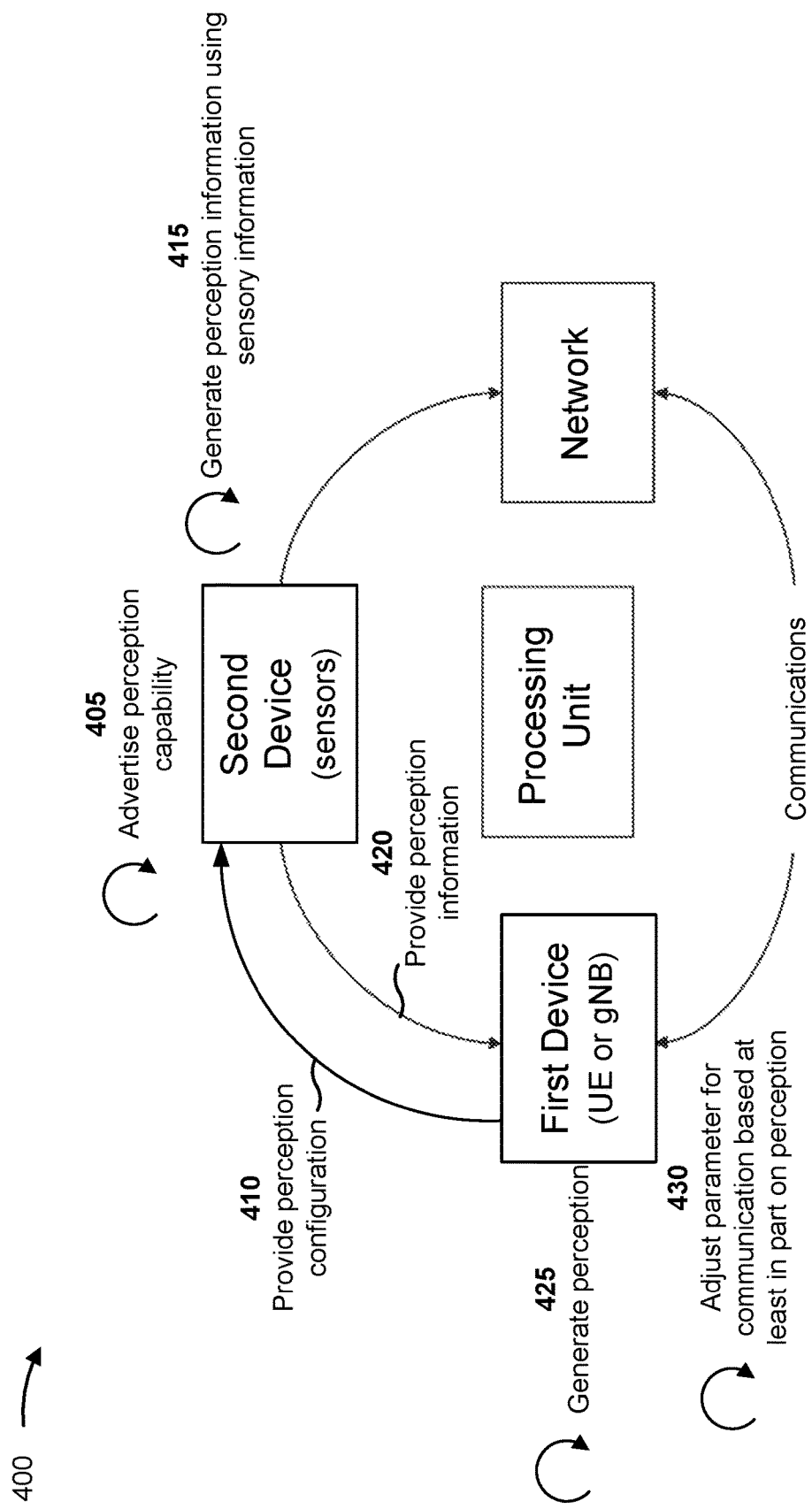
FIG. 4 is a diagram illustrating an example of a perception architecture, in accordance with the present disclosure.

FIG. 4 is a diagram illustrating an example 400 of a perception architecture, in accordance with the present disclosure.

A device used in an NR application may be equipped with multiple sensors, including a camera, a proximity detector, a barometer, a magnetic compass, a magnetometer, a radar, and/or a lidar. The device may also be equipped with an inertial measurement unit (IMU) such as a gyroscope or an accelerometer. According to various aspects described herein, a wireless communication device may use sensor information obtained from such sensors to generate a perception of the environment, which may a physical and/or radio frequency (RF) understanding of the environment. The perception may include location and impact information about blocking objects, beam conditions, beam blockage, and/or beam reflection in the environment. The perception may assist devices with wireless communication. The perception capability of a device (for determining perception information about the environment from sensors) may be shared with wireless communication devices, and the wireless communication devices may use perception information provided by a device with sensors to adjust one or more parameters for wireless communication. In some aspects, the device may be configured to perform a discovery procedure to discover a second device offering perception information Example 400 shows an architecture of a system that uses a perception of the environment to improve wireless communication. A first device such as a UE, a gNB, or a network (radio access network (RAN) or core network) may request information from one or more sensors, which may be on a second device, in a second device, or collocated with the second device. However, in another example, the one or more sensors may also be located on the first device itself or also dispersed across the first and the second device and optionally one or more other devices. The second device may be the same as the first device or may be a separate device. In example 400, the first device may be a UE, and the second device may be another UE. In other scenarios, the first device may be a UE, and the second device may be a gNB. In some scenarios, the first device may be a gNB, and the second device may be a UE. In some aspects, a sensor may be separate from UEs or gNBs but instead reside in a separate device such as surveillance camera, a radar system, a traffic surveillance system or the like.

As shown by reference number 405, the second device may advertise a perception capability for obtaining and processing sensor information. The first device may discover the second device, with its perception capability. As part of the discovery process, the first device may establish a sensing session between the first device, the second device, and/or a processing entity.

Sensors may be on, in, or co-located with a second device that is a UE and may include, for example, an IMU sensor, a camera, or sensors for six degrees of freedom (6DoF), such as in a head-mounted display (HMD). Sensors may be on, in, or co-located with a second device that is a base station (e.g., gNB), including cameras near base station antennas. The sensors may be located separate from the first device and may include a surveillance camera or a radar. The sensors may be part of an NR service-based architecture, may produce NR services, may provide service advertisements, and/or may be part of service discovery via a network repository function (NRF) for core network functions. The sensors may be part of a native UE/RAN protocol and may use radio resource control (RRC) signaling to provide a perception capability and to provide perception information (e.g., via measurement configuration and/or reports). The signaling of perception capabilities and perception information may enable new wireless communication optimizations. The sensors may include at least one sensor for providing a perception information for the environment of the first device, in particular wherein the sensor is at least one of: an image sensor, a video camera, an inertial sensor, an orientation sensor, a barometric sensor, a magnetic compass direction sensor, a proximity sensor, a radar sensor, or a lidar sensor. In some aspects, one or more sensors may be on the first device.

As shown by reference number 410, the first device may provide a perception configuration to the second device housing the sensors. The perception configuration may specify what sensor information is to be obtained from sensors. The perception configuration may also request some processing of the sensory information to generate perception information, which may better annotate a result of the sensory information. As shown by reference number 415, the second device may generate the perception information using the sensory information from the sensors.

As shown by reference number 420, the second device may provide perception information to the first device, autonomously or at the request of the first device. The perception information may include raw sensor information, or the perception information may include processed sensor information (e.g., an orientation of the first device, a velocity of the first device, blockage proximity to the first device). As shown by reference number 425, the first device may generate a perception of the environment based at least in part on the perception information. The perception may include information about blockage in the environment, predicted blockages, device movement, or other information about the environment that may affect wireless communication. The processing unit may generate the perception and may be on the first device, or elsewhere (e.g., edge processor, open RAN (O-RAN) controller, central unit, distributed unit, cloud server). In certain variants, the first device may obtain perception information based on its own sensors.

The first device may act on the perception of the environment. As shown by reference number 430, the first device may adjust one or more parameters for wireless communication based at least in part on the perception. For example, based on a predicted blockage indicated by the perception, the first device may widen a beam during the predicted blockage, which may increase the chance of successful communication during a blockage event. As a result, the first device may improve communications and conserve processing resources and signaling resources that would otherwise be consumed with retransmissions for blocked communications. In some aspects, the processing unit may be used to adjust the parameter. The first device may transmit an indication of the parameter, or other parameters, to the processing unit. The indication may include a value for a parameter, such as an MCS, a coding rate, a beam width, and/or a beam codebook.

As indicated above, FIG. 4 is provided as an example. Other examples may differ from what is described with regard to FIG. 4.

Figure 5:
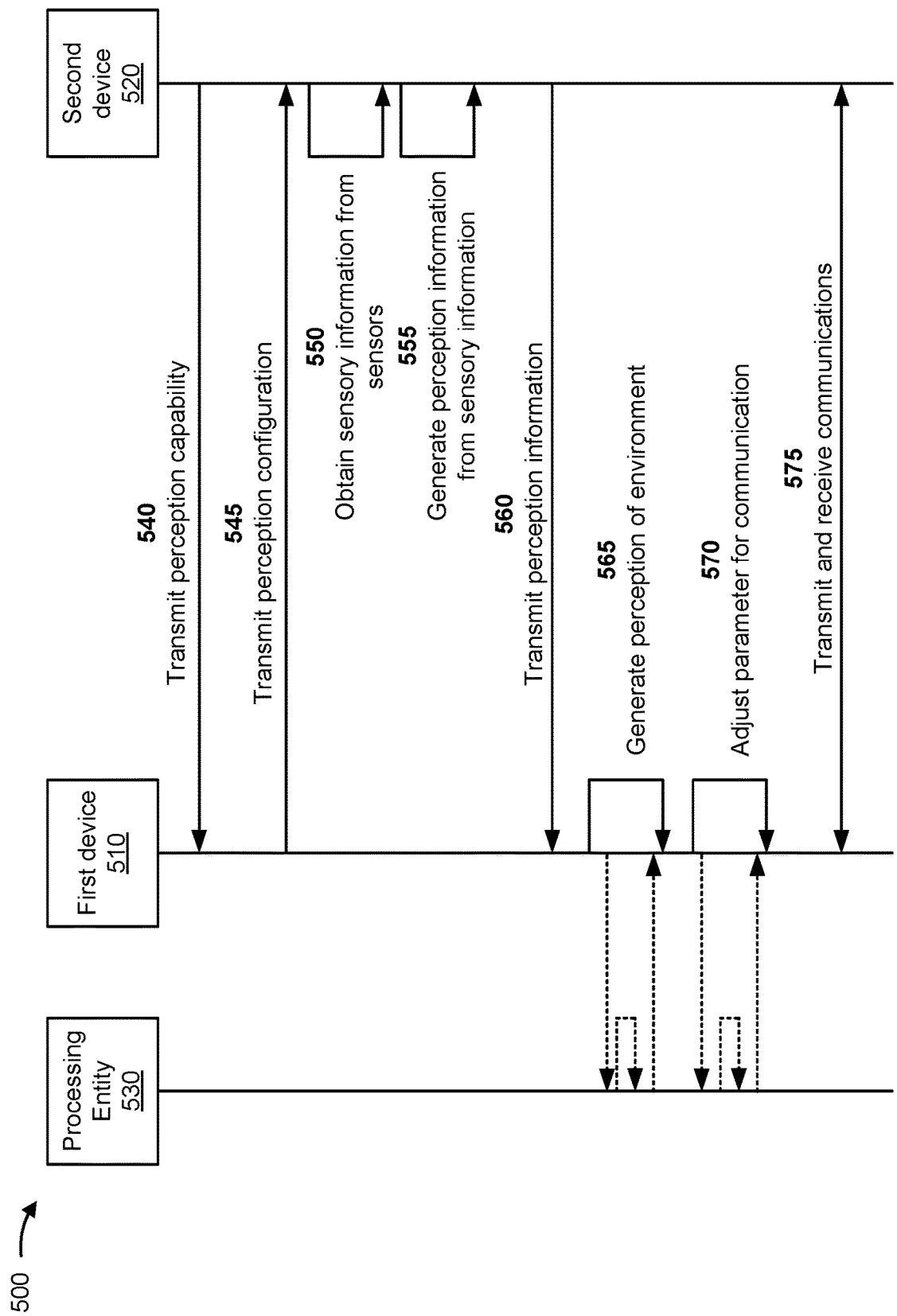
FIG. 5 is a diagram illustrating an example associated with using a perception of the environment to assist with wireless communication, in accordance with the present disclosure.

FIG. 5 is a diagram illustrating an example 500 associated with using a perception of the environment to assist with wireless communication, in accordance with the present disclosure. As shown in FIG. 5, a first device 510 (e.g., a UE 120, base station 110) and a second device 520 (e.g., a UE 120, base station 110) may communicate with one another. The first device 510 and the second device 520 may communicate with a processing entity 530 (e.g., edge processor, O-RAN controller, central unit, distributed unit), which may be at the first device 510, at the second device 520, or separate from the first device 510 and the second device 520, as shown in example 500.

Blockage may involve a sudden worsening of link conditions due to a person or object impeding the propagation of a signal between a transmitter and a receiver. With mmWave signals, narrow beams and multipath propagation may involve blockage of one beam but not of other beams. There are two types of blockage: static (caused by a static object in the scene such as a wall or a couch) and dynamic (caused by a dynamic object such as a moving person). Static blockage or dynamic blockage may be predicted using sensory information from one or more sensors. In this way, a device may adjust (e.g., optimize) one or more parameters for communication for better link quality during blockage. The device may experience lower latency, a better block error rate (BLER), and/or a lower number of retransmissions by proactively adjusting for an upcoming blockage. The device may consume less power by suggesting, for measurements, beams that are not blocked.

The first device 510 may request perception information and/or the second device 520 may provide the perception information in order to predict an upcoming blockage. The upcoming blockage may be predicted by identifying a line of sight (LoS) signal propagation path, detecting (via sensors) a blockage, positioning the blockage with respect to the LoS signal propagation path, identifying when the blockage will overlap with the LoS signal propagation path, and identifying an impact of the blockage. In some aspects, the second device 520 may identify the LoS signal propagation path via object detection with a stereo camera, NR positioning via a positioning service, and/or RF positioning using beam measurements and codebook information (e.g., transmission feedback for beams). For example, poor or negative feedback for a beam may indicate blockage in that beam direction. The second device 520 may detect the blockage and a position of the blockage using object detection via motion detection and localization via cameras or using RF sensing detection of reflectors (e.g., using beam measurements and codebook information). In some aspects, the first device 510 may detect the blockage and a position of the blockage using object detection based on its own sensors.

In some aspects, the first device 510, the second device 520, and/or the processing entity 530 may predict an upcoming blockage using artificial intelligence (AI), including machine learning (ML). The input to the ML model may include a blockage position(s), an extent of a covered area (e.g., done by a separate ML model), UE beam direction(s) and measurements, gNB beam direction(s) and measurements, and/or environment scene(s). The output of the ML model may include an indication of an upcoming blockage, a blockage type, a duration of the blockage, an amount of fade (e.g., RSRP decrease), and/or a blockage start time. A blockage position may be estimated using object detection and using beam measurements and codebook information. The first device 510 may receive the beam codebooks, and the reports may be received by the sensing entity(s).

In some aspects, the second device 520 may advertise (e.g., broadcast) a perception capability, which may indicate what sensors are available, sensory information that can be obtained, and/or perception information that may be provided to a requesting device. As shown by reference number 540, the second device 520 may transmit a perception capability to the first device 510.

In some aspects, as shown by reference number 545, the first device 510 may transmit a perception configuration that specifies what perception information the second device 520 is to obtain. The perception configuration may be based at least in part on the perception capability of the second device 520. For example, the perception configuration may specify that the second device 520 is to obtain a picture of an object to be detected using a camera that was reported in the perception capability. The object may be the first device 510. The perception configuration may specify that the second device 520 is to obtain a position of the first device 510 in a global coordinate frame using location and/or orientation sensors. The perception configuration may specify that the second device 520 is to obtain a beam codebook using location and/or orientation sensors. The perception configuration may specify an orientation of the first device 510, a velocity of the first device 510, a blockage proximity to the first device 510, a blockage timing, and/or other perception information that is to be obtained.

As shown by reference number 550, the second device 520 may obtain sensory information from the one or more sensors associated with the second device 520. The sensory information may include visual information such as an image (e.g., 3D image, stereo image), a video, an inertial measurement, an orientation measurement, a pressure measurement (e.g., barometric measurement), a magnetic compass direction, a proximity measurement, a radar measurement, and/or a lidar measurement.

In some aspects, as shown by reference number 555, the second device 520 may use sensory information to generate perception information, which may describe the environment at a higher level. For example, the second device 520 may use sensory information to generate a message indicating an existing or upcoming blockage, a time of the upcoming blockage, an expected extent of the existing or upcoming blockage (e.g., RSRP drop), a duration of the existing or upcoming blockage, and the affected beams. Perception information may be associated with characteristics of the environment and may include, for example, an image associated with an existing or upcoming blockage (e.g., image of the base station or blocking object), a position associated with the existing or upcoming blockage, an orientation associated with the existing or upcoming blockage, a beam codebook associated with the existing or upcoming blockage, a message indicating the existing or upcoming blockage, a time of the upcoming blockage, an expected extent of the existing or upcoming blockage, a duration of the existing or upcoming blockage, or one or more beams affected by the existing or upcoming blockage. As shown by reference number 560, the second device 520 may transmit the perception information to the first device 510.

As shown by reference number 565, the first device 510 may generate a perception of the environment based at least in part on the perception information. A perception may include characteristics of the environment such as described below. For example, a perception of the environment may include an orientation of the firs device 510, a velocity of the first device 510, a blockage proximity to the first device 510, a blockage timing, a blockage indication, a blockage duration, a signal fade due to blockage, a set of beams that are blocked, a new set of beams to be used, a location of the first device or the second device, an orientation of the first device or the second device, a velocity of the first device or the second device, a set of beams to use during motion, and/or an RF map of the environment. This may include using the processing entity 530 for help with generating the perception. The first device 510 may use perception information from multiple sensor locations or multiple devices, such as additional perception information from a third device. Cooperative learning may involve a learning entity and one or more sensing entities, such as two gNBs, two UEs, a perception processor, or a combination thereof. Federated learning may involve multiple learning entities that determine the perception of the environment, and the first device 510 may use federated learning to develop the perception.

As shown by reference number 570, the first device 510 may adjust a parameter for a communication. This may include not measuring blocked beams, measuring only certain wide beams from certain phasors, or refining around a given blockage duration. The first device 510 may lower an MCS, increase a coding rate, widen a beam, switch to another beam (e.g., second-best synchronization signal block (SSB) beam, third-best SSB beam), or perform a handover based at least in part on a predicted blockage. The first device 510 may select a beam codebook based at least in part on an upcoming blockage, add a beam for measurement reporting, decrease a quantity of layers, assign a reference signal (e.g., channel state information reference signal (CSI-RS)), or transmit a new value for the parameter. For example, the first device 501 may select a beam codebook that is associated with a wider beam, a beam in a different direction, a more reliable beam, and/or a beam that can otherwise account for a blockage. The first device 510 may transmit one or more of the parameters to the processing entity 530. In some aspects, the first device 510 may use the processing entity 530 to help with optimizing one or more parameters for wireless communication based at least in part on the perception information. As shown by reference number 575, the first device 510 may communicate with the second device 520 (e.g., transmit and receive communications) using adjusted (optimized) parameters.

For mmWave signaling, narrow analog beams may be used to compensate for the high pathloss. The narrow beams are expected to have precise beam alignment between the UE and gNB. Beam tracking may be an issue when selecting beams to align between the UE and the gNB. One cause of beam misalignment is the motion of the first device 510. In some aspects, the first device 510 may predict a motion of a user of the first device 510 and compensate beams of higher importance. This may improve link quality during motion, lower latency, and lower power consumption.

For LoS signals, the first device 510 may predict and compensate for motion by identifying the location and/or pose of the first device 510 with respect to a reference point (e.g., gNB if in LoS). The first device 510 may use the assistance of the second device 520 to identify a location of the first device 510. The second device 520 may determine perception information for the environment, which may be a relative position of the first device 510 with respect to the second device 520. The first device 510 may determine the perception based at least in part on the perception information from the second device 520, which may include object detection using stereo cameras, a position of the first device 510 using a positioning service (e.g., navigation and timing (NT) positioning), and/or RF positioning (e.g., using beam measurements and codebook information).

In some aspects, the first device 510 and/or the processing entity 530 may use machine learning to predict a motion of the first device 510 and/or the second device 520. Inputs to the machine learning model may include beam directions and measurements (e.g., RSRP) of the first device 510 and/or the second device 520, environmental scenes (e.g., object locations, topology, object density), current/previous positions of the first device 510, and/or current/previous poses of the first device 510. Outputs of the machine learning model may include a next position of the first device 510, a next beam to use, and/or an expected beam quality (e.g., RSRP). Perception information in this scenario may include a location, pose, or orientation of the first device 510 with respect to a reference point, an image associated with movement of the first device 510, a beam codebook associated with the movement of the first device 510, a position of the first device 510, a velocity of the movement of first device 510, or a beam pair to be used for the movement of the first device 510. For example, a beam codebook associated with the movement of the first device 510 may include a beam codebook that accounts for how much and/or how fast the first device 510 is moving.

The perception of the environment may include other characteristics of the environment. In some aspects, the perception of the environment for the motion prediction scenario may include a position of the first device 510 within the environment, a rate of motion of the first device 510, and/or a set of beam pairs to be used by the first device 510 and the second device 520. This information may also be passed from the second device 520 to the first device 510 as perception information.

The perception of the environment and the associated prediction of movement of the first device 510 may include building a spatial map of the best beam-pair location and orientation. Motion prediction may be used to build motion profile of the first device 510 (e.g., a lookup table specifying high/medium/low motion of the first device 510), lower or increase the MCS for high/low motion profile users, widen a beam used for beam management for high motion profile users, assign a CSI-RS (P2/P3) for low motion profile users, and/or perform a handover.

In some aspects, the perception of the environment may include an understanding or information about how RF signals propagate in the environment. Accordingly, the perception may include a 3D RF map of the environment. The 3D RF map may provide a position/angle of reflectors, a position of blockage, beam selections, UE beam coordination, and/or gNB beam coordination. By using a 3D RF map, the first device 510 and the second device 520 may experience better link quality during motion and blockage, lower latency, and/or lower power consumption (e.g., if beams are in the right directions).

The first device 510 and the second device 520 may collaborate to map the RF environment. This may include gathering location-based RF measurements, such as beam directions and RSRP, identifying objects in the scene, identifying the relative distances between objects in the scene, and aggregating all information together to build the 3D map. The second device 520 may identify objects in the scene and distances between objects by sensing objects with stereo camera images, using a positioning service, and/or using RF positioning (e.g., gNB/UE use beam measurements and codebook information (or vice versa)). The perception information may include a location, pose, or orientation of the first device 510 with respect to a reference point, visual information such as an image associated with movement of the first device 510, a beam codebook associated with the movement of the first device 510, a position of the first device 510, a velocity of the movement of first device 510, or a beam pair to be used for the movement of the first device 510.

The first device 510, the second device 520, the processing entity 530, and/or other devices may aggregate all the information together (e.g., objects, relative positions, beam directions) to build the 3D RF map. The perception information from the second device 520 may include positional information, RF information (e.g., RSRP), and/or a set of points within the environment. Machine learning may be used to generate the 3D RF map. Similar to other optimizations, the first device 510 may use the 3D RF map (perception) to adjust and optimize parameters for communication. For example, the first device 510 may select a beam configuration based at least in part on the location of the first device 510, the location of a communication target (e.g., UE, device, network entity), and/or any RF blockages or interference indicated in the 3D RF map. Wider or stronger beams may be used for issues indicated in the 3D RF map.

In some aspects, the perceptions described above may be generated using cooperative sensing and/or federated learning. That is, there may be multiple sensing entities. For example, for cooperative sensing, sensor measurements may be from multiple sensing entities (e.g., multiple UEs, multiple gNBs) that are shared with a central processing entity(s) that uses the joint information to compute the desired outcome, or to train a machine learning model that is then shared with the UEs/gNBs.

For federated learning, multiple UEs/gNB/processors may train local machine learning models for the prediction of the sensing outcomes described above. The trained models are then shared with a central processor that fuses the information and redistributes an improved machine learning model to the UEs/gNBs. Federated learning may include signaling the perception configuration (e.g., sensors to be used, sensory tasks, sensory information to be obtained) across all the cooperating entities. Sharing the perception configuration may allow the multiple sensing entities to build a federated learning model.

In some aspects, the RRC configuration may be expanded to support sensor or perception capabilities. The first device and the second device may use Layer 1 (L1) signaling (e.g., downlink control information, uplink control information) or Layer 2 (L2) signaling (e.g., medium access control control element (MAC CE)) that includes a measurement report that is based at least in part on the perception information. The measurement report may indicate that more beams are to be included, an indication that some beams are predicted for a specified time (e.g., Xms) ahead, or an indication to lower an MCS, lower a quantity of layers, or use a broader beam for a certain interval of time.

By leveraging device sensors (e.g., cameras, XR sensors), communications may be improved to reduce latency, increase performance, and reduce power.

As indicated above, FIG. 5 is provided as an example. Other examples may differ from what is described with respect to FIG. 5.

Figure 6:
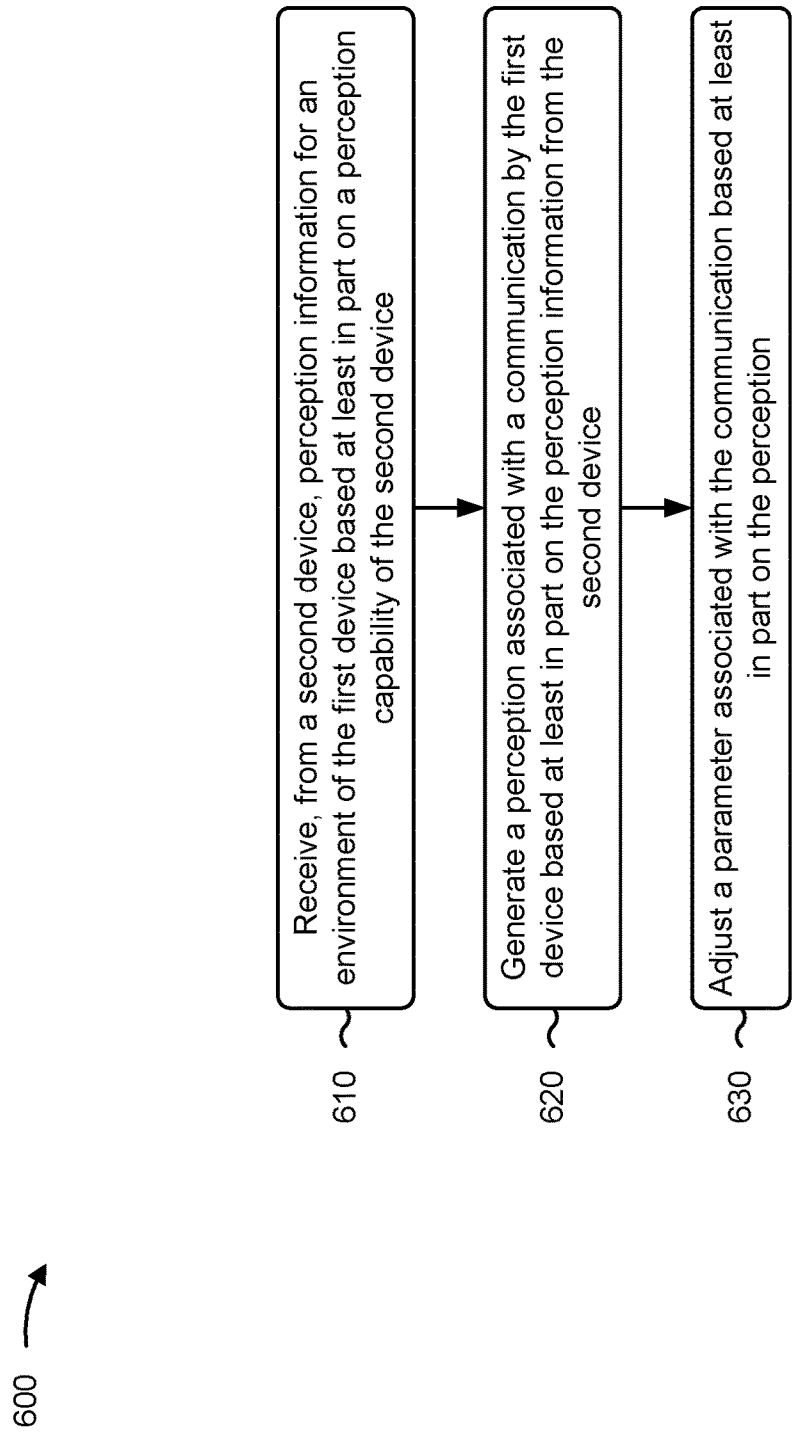
FIG. 6 is a diagram illustrating an example process performed, for example, by a first device, in accordance with the present disclosure.

FIG. 6 is a diagram illustrating an example process 600 performed, for example, by a first device, in accordance with the present disclosure. Example process 600 is an example where the first device (e.g., first device 510) performs operations associated with perception-assisted wireless communication.

As shown in FIG. 6, in some aspects, process 600 may include receiving, from a second device, perception information for an environment of the first device based at least in part on a perception capability of the second device (block 610). For example, the first device (e.g., using communication manager 140 or 150 and/or reception component 802 depicted in FIG. 8) may receive, from a second device (e.g., second device 520), perception information for an environment of the first device based at least in part on a perception capability of the second device, as described above.

As further shown in FIG. 6, in some aspects, process 600 may include generating a perception associated with a communication by the first device based at least in part on the perception information from the second device, where the perception indicates characteristics of the environment (block 620). For example, the first device (e.g., using communication manager 140 or 150 and/or perception component 808 depicted in FIG. 8) may generate a perception associated with a communication by the first device based at least in part on the perception information from the second device, where the perception indicates characteristics of the environment, as described above.

As further shown in FIG. 6, in some aspects, process 600 may include adjusting a parameter associated with the communication based at least in part on the perception (block 630). For example, the first device (e.g., using communication manager 140 or 150 and/or adjustment component 810 depicted in FIG. 8) may adjust a parameter associated with the communication based at least in part on the perception, as described above.

Process 600 may include additional aspects, such as any single aspect or any combination of aspects described below and/or in connection with one or more other processes described elsewhere herein.

In a first aspect, process 600 includes receiving an indication of the perception capability of the second device.

In a second aspect, alone or in combination with the first aspect, process 600 includes transmitting, to the second device, a perception configuration that specifies the perception information that is to be obtained.

In a third aspect, alone or in combination with one or more of the first and second aspects, the perception information includes or is based at least in part on sensory information obtained from one or more sensors associated with the second device.

In a fourth aspect, alone or in combination with one or more of the first through third aspects, sensory information includes one or more of visual information such as an image, a video, an inertial measurement, an orientation measurement, a barometric measurement, a magnetic compass direction, a proximity measurement, a radar measurement, or a lidar measurement.

In a fifth aspect, alone or in combination with one or more of the first through fourth aspects, the perception includes one or more of an orientation, a velocity, a blockage proximity, a blockage timing, a blockage indication, a blockage duration, a signal fade due to blockage, a set of beams that are blocked, a new set of beams to be used, a location of the first device or the second device, an orientation of the first device or the second device, a velocity of the first device or the second device, a set of beams to use during motion, or a radio frequency map of the environment.

In a sixth aspect, alone or in combination with one or more of the first through fifth aspects, generating the perception includes transmitting sensory information to a processing entity, and receiving perception information.

In a seventh aspect, alone or in combination with one or more of the first through sixth aspects, adjusting the parameter includes transmitting information associated with the perception to a processing entity and receiving an adjustment to apply to the parameter.

In an eighth aspect, alone or in combination with one or more of the first through seventh aspects, process 600 includes transmitting an indication of the parameter to the processing entity.

In a ninth aspect, alone or in combination with one or more of the first through eighth aspects, the parameter is for one or more of link adaptation, beam management, channel estimation, localization, handover, RSRP prediction, or roaming.

In a tenth aspect, alone or in combination with one or more of the first through ninth aspects, the first device is a base station, and the second device is a UE.

In an eleventh aspect, alone or in combination with one or more of the first through tenth aspects, the first device is a UE, and the second device is a base station. In some aspects, both the first device and the second device are UEs.

In a twelfth aspect, alone or in combination with one or more of the first through eleventh aspects, the perception information includes one or more of an image associated with an upcoming blockage, a position associated with the upcoming blockage, an orientation associated with the upcoming blockage, a beam codebook associated with the upcoming blockage, a message indicating the upcoming blockage, a time of the upcoming blockage, an expected extent of the upcoming blockage, a duration of the upcoming blockage, or one or more beams affected by the upcoming blockage.

In a thirteenth aspect, alone or in combination with one or more of the first through twelfth aspects, process 600 includes using machine learning to predict the upcoming blockage based at least in part on the perception information.

In a fourteenth aspect, alone or in combination with one or more of the first through thirteenth aspects, adjusting the parameter includes one or more of lowering an MCS, increasing a coding rate, widening a beam, selecting a beam codebook based at least in part on an upcoming blockage, switching to another beam, adding a beam for measurement reporting, decreasing a quantity of layers, performing a handover, assigning a reference signal, or transmitting a new value for the parameter.

In a fifteenth aspect, alone or in combination with one or more of the first through fourteenth aspects, the perception information includes a location, pose, or orientation of the first device with respect to a reference point, an image associated with movement of the first device, a beam codebook associated with the movement of the first device, a position of the first device, a velocity of the movement of first device, or a beam pair to be used for the movement of the first device.

In a sixteenth aspect, alone or in combination with one or more of the first through fifteenth aspects, process 600 includes using machine learning to predict the movement of the first device based at least in part on the perception information.

In a seventeenth aspect, alone or in combination with one or more of the first through sixteenth aspects, the perception information includes one or more of an image associated with an object in the environment, a location associated with the object, a location-based radio frequency measurement associated with the object, a distance of the object from the first device, a position of another object relative to a position of the object, or a beam codebook associated with locating the object.

In an eighteenth aspect, alone or in combination with one or more of the first through seventeenth aspects, generating the perception includes generating an RF map that includes objects of the environment and beam directions.

In a nineteenth aspect, alone or in combination with one or more of the first through eighteenth aspects, generating the RF map includes using machine learning to generate the RF map.

In a twentieth aspect, alone or in combination with one or more of the first through nineteenth aspects, process 600 includes receiving, from a third device, additional perception information associated with one or more sensors of the third device, where generating the perception includes generating the perception based at least in part on the perception information from the second device and the additional perception information from the third device.

In a twenty-first aspect, alone or in combination with one or more of the first through twentieth aspects, generating the perception includes using machine learning to generate the perception.

In a twenty-second aspect, alone or in combination with one or more of the first through twenty-first aspects, generating the perception includes using federated learning to generate the perception.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
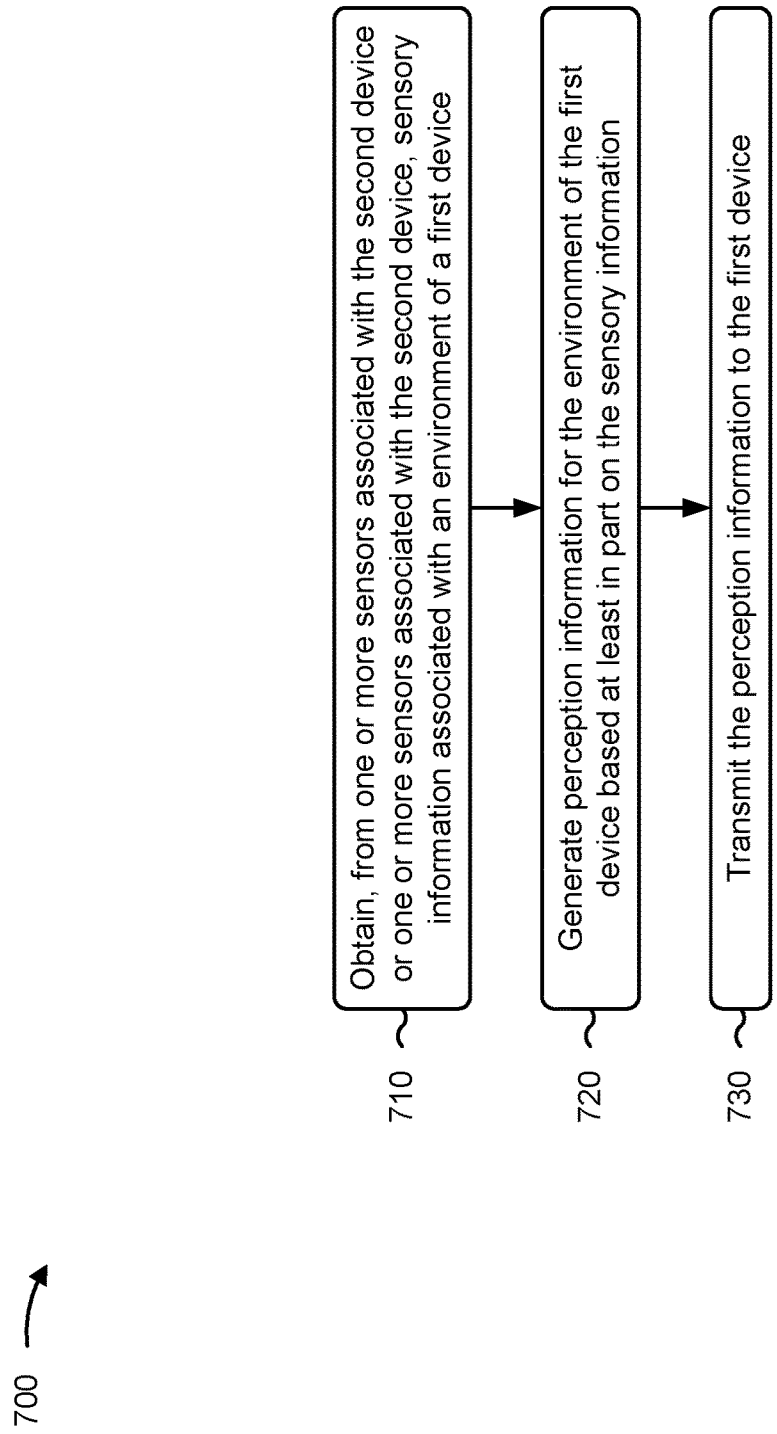
FIG. 7 is a diagram illustrating an example process performed, for example, by a second device, in accordance with the present disclosure.

FIG. 7 is a diagram illustrating an example process 700 performed, for example, by a second device, in accordance with the present disclosure. Example process 700 is an example where the second device (e.g., second device 520) performs operations associated with perception-assisted wireless communication.

As shown in FIG. 7, in some aspects, process 700 may include obtaining, from one or more sensors associated with the second device or one or more sensors associated with the second device, sensory information associated with an environment of a first device (block 710). For example, the second device (e.g., using communication manager 140 or 150 and/or sensory component 908 depicted in FIG. 9) may obtain, from one or more sensors associated with the second device or one or more sensors associated with the second device, sensory information associated with an environment of a first device, as described above.

As further shown in FIG. 7, in some aspects, process 700 may include generating perception information for the environment of the first device based at least in part on the sensory information, where the perception information is associated with characteristics of the environment (block 720). For example, the second device (e.g., using communication manager 140 or 150 and/or perception information component 910 depicted in FIG. 9) may generate perception information for the environment of the first device based at least in part on the sensory information, where the perception information is associated with characteristics of the environment, as described above.

As further shown in FIG. 7, in some aspects, process 700 may include transmitting the perception information to the first device (block 730). For example, the second device (e.g., using communication manager 140 or 150 and/or transmission component 904 depicted in FIG. 9) may transmit the perception information to the first device, as described above.

Process 700 may include additional aspects, such as any single aspect or any combination of aspects described below and/or in connection with one or more other processes described elsewhere herein.

In a first aspect, process 700 includes transmitting an indication of a perception capability of the second device.

In a second aspect, alone or in combination with the first aspect, process 700 includes receiving, from the first device, a perception configuration that specifies the perception information that is to be obtained.

In a third aspect, alone or in combination with one or more of the first and second aspects, the perception information includes or is based at least in part on sensory information obtained from one or more sensors associated with the second device.

In a fourth aspect, alone or in combination with one or more of the first through third aspects, sensory information includes one or more of visual information such as an image, a video, an inertial measurement, an orientation measurement, a barometric measurement, a magnetic compass direction, a proximity measurement, a radar measurement, or a lidar measurement.

In a fifth aspect, alone or in combination with one or more of the first through fourth aspects, the first device is a base station, and the second device is a UE.

In a sixth aspect, alone or in combination with one or more of the first through fifth aspects, the first device is a UE, and the second device is a base station.

In a seventh aspect, alone or in combination with one or more of the first through sixth aspects, the perception information includes one or more of visual information such as an image associated with an existing or upcoming blockage, a position associated with the existing or upcoming blockage, an orientation associated with the existing or upcoming blockage, a beam codebook associated with the existing or upcoming blockage, a message indicating the existing or upcoming blockage, a time of the upcoming blockage, an expected extent of the existing or upcoming blockage, a duration of the existing or upcoming blockage, or one or more beams affected by the existing or upcoming blockage.

In an eighth aspect, alone or in combination with one or more of the first through seventh aspects, process 700 includes using machine learning to generate the perception information.

In a ninth aspect, alone or in combination with one or more of the first through eighth aspects, the perception information includes a location, pose, or orientation of the first device with respect to a reference point, an image associated with movement of the first device, a beam codebook associated with the movement of the first device, a position of the first device, a velocity of the movement of first device, or a beam pair to be used for the movement of the first device.

In a tenth aspect, alone or in combination with one or more of the first through ninth aspects, process 700 includes using machine learning to predict the movement of the first device based at least in part on the perception information.

In an eleventh aspect, alone or in combination with one or more of the first through tenth aspects, the perception information includes one or more of visual information such as an image associated with an object in the environment, a location associated with the object, a location-based radio frequency measurement associated with the object, a distance of the object from the first device, a position of another object relative to a position of the object, or a beam codebook associated with locating the object.

In a twelfth aspect, alone or in combination with one or more of the first through eleventh aspects, process 700 includes generating an RF map that includes objects of the environment and beam directions, and including the RF map in the perception information.

In a thirteenth aspect, alone or in combination with one or more of the first through twelfth aspects, generating the RF map includes using machine learning to generate the RF map.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
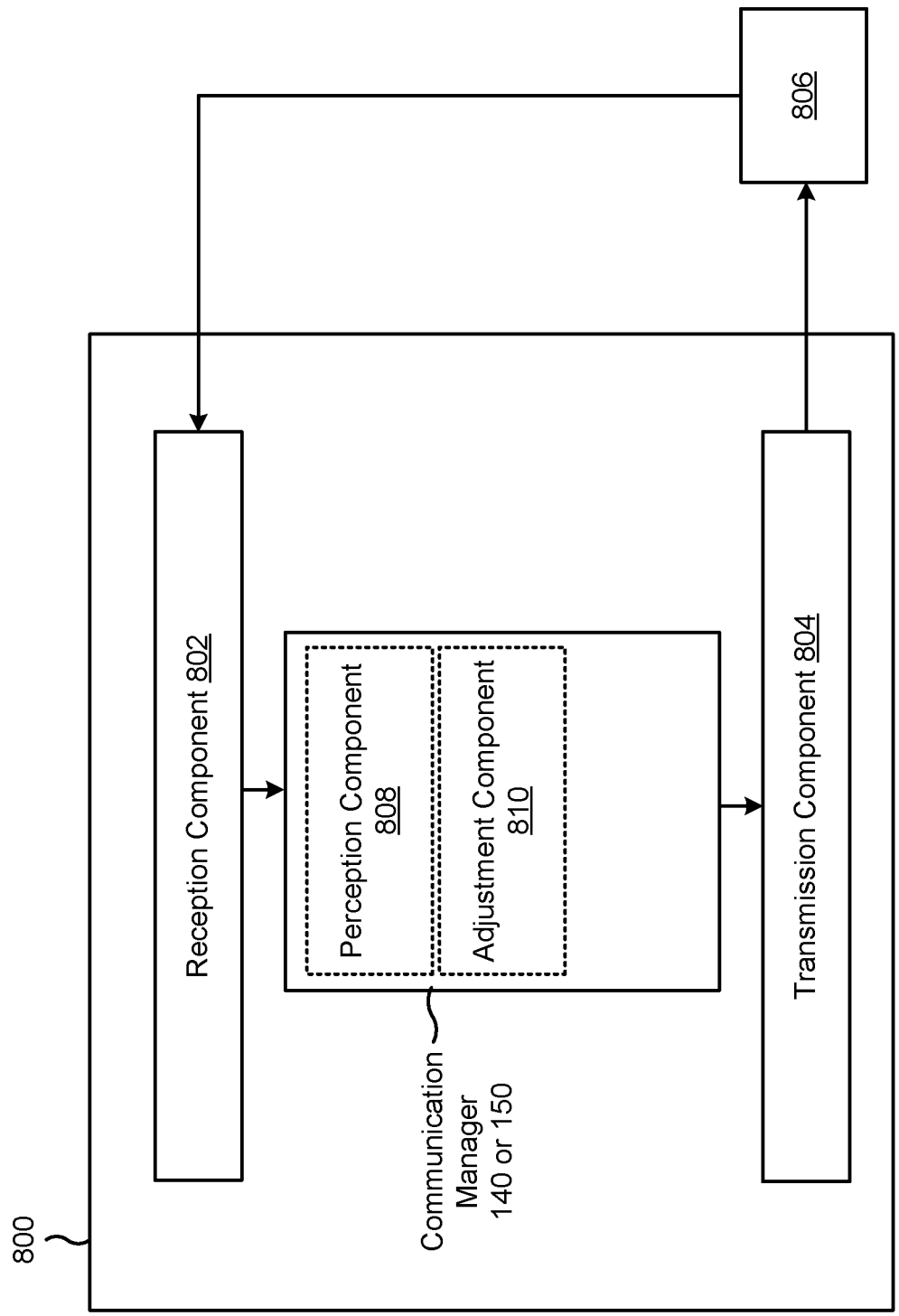
FIGS. 8-9 are diagrams of example apparatuses for wireless communication, in accordance with the present disclosure.

FIG. 8 is a diagram of an example apparatus 800 for wireless communication. The apparatus 800 may be a first device (e.g. first device 510, processing entity 530), or a first device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140 or 150. The communication manager 140 or 150 may include a perception component 808 and/or an adjustment component 810, among other examples.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the first device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the first device described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the first device described in connection with FIG. 2. In some aspects, the transmission component 804 may be co-located with the reception component 802 in a transceiver.

The reception component 802 may receive, from a second device, perception information for an environment of the first device based at least in part on a perception capability of the second device. The perception component 808 may generate a perception associated with a communication by the first device based at least in part on the perception information from the second device, where the perception indicates characteristics of the environment. The adjustment component 810 may adjust a parameter associated with the communication based at least in part on the perception.

The reception component 802 may receive an indication of the perception capability of the second device. The transmission component 804 may transmit, to the second device, a perception configuration that specifies the perception information that is to be obtained. The transmission component 804 may transmit an indication of the parameter to the processing entity.

The perception component 808 may use machine learning to predict the upcoming blockage based at least in part on the perception information. The perception component 808 may use machine learning to predict the movement of the first device based at least in part on the perception information.

The reception component 802 may receive, from a third device, additional perception information associated with one or more sensors of the third device, where generating the perception includes generating the perception based at least in part on the perception information from the second device and the additional perception information from the third device.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
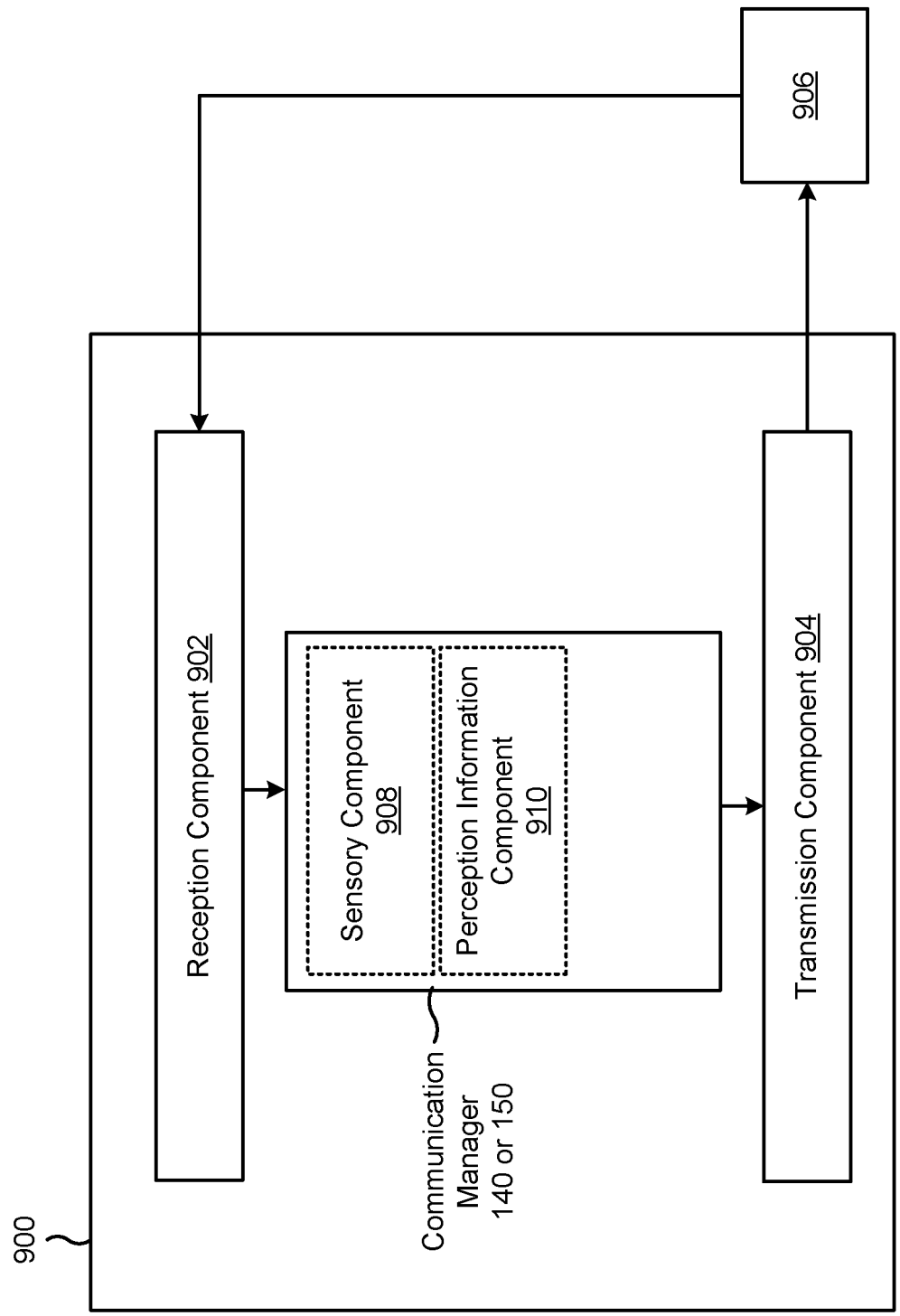

FIG. 9 is a diagram of an example apparatus 900 for wireless communication. The apparatus 900 may be a second device (e.g., second device 520), or a second device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140 or 150. The communication manager 140 or 150 may include a sensory component 908 and/or a perception information component 910, among other examples.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the second device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the second device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the second device described in connection with FIG. 2. In some aspects, the transmission component 904 may be co-located with the reception component 902 in a transceiver.

The sensory component 908 may obtain, from one or more sensors of the second device or one or more sensors associated with the second device or one or more sensors communicatively coupled with the second device, sensory information associated with an environment of a first device. The perception information component 910 may generate perception information for the environment of the first device based at least in part on the sensory information, wherein the perception information is associated with characteristics of the environment. The transmission component 904 may transmit the perception information to the first device.

The transmission component 904 may transmit an indication of a perception capability of the second device. The reception component 902 may receive, from the first device, a perception configuration that specifies the perception information that is to be obtained. The perception information component 910 may use machine learning to generate the perception information. The perception information component 910 may use machine learning to predict the movement of the first device based at least in part on the perception information.

The perception information component 910 may generate an RF map that includes objects of the environment and beam directions. The perception information component 910 may include the RF map in the perception information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first device, comprising: receiving, from a second device, perception information for an environment of the first device based at least in part on a perception capability of the second device; generating a perception associated with a communication by the first device based at least in part on the perception information from the second device, wherein the perception indicates characteristics of the environment; and adjusting a parameter associated with the communication based at least in part on the perception.

Aspect 2: The method of Aspect 1, further comprising receiving an indication of the perception capability of the second device.

Aspect 3: The method of Aspect 1 or 2, further comprising transmitting, to the second device, a perception configuration that specifies the perception information that is to be obtained.

Aspect 4: The method of any of Aspects 1-3, wherein the perception information includes or is based at least in part on sensory information obtained from one or more sensors associated with the second device.

Aspect 5: The method of any of Aspects 1-4, wherein the sensory information includes one or more of an image, a video, an inertial measurement, an orientation measurement, a barometric measurement, a magnetic compass direction, a proximity measurement, a radar measurement, or a lidar measurement.

Aspect 6: The method of any of Aspects 1-5, wherein the perception includes one or more of an orientation of the first device, a velocity of the first device, a blockage proximity to the first device, a blockage timing, a blockage indication, a blockage duration, a signal fade due to blockage, a set of beams that are blocked, a new set of beams to be used, a location of the first device or the second device, an orientation of the first device or the second device, a velocity of the first device or the second device, a set of beams to use during motion, or a radio frequency map of the environment.

Aspect 7: The method of any of Aspects 1-6, wherein generating the perception includes: transmitting sensory information to a processing entity; and receiving perception information.

Aspect 8: The method of any of Aspects 1-7, wherein adjusting the parameter includes: transmitting information associated with the perception to a processing entity; and receiving an adjustment to apply to the parameter.

Aspect 9: The method of Aspect 8, further comprising transmitting an indication of the parameter to the processing entity.

Aspect 10: The method of any of Aspects 1-9, wherein the parameter is for one or more of link adaptation, beam management, channel estimation, localization, handover, reference signal received power prediction, or roaming.

Aspect 11: The method of any of Aspects 1-10, wherein the first device is a base station, and the second device is a user equipment.

Aspect 12: The method of any of Aspects 1-10, wherein the first device is a user equipment, and the second device is a base station.

Aspect 13: The method of any of Aspects 1-10, wherein the first device is a user equipment, and the second device is a user equipment.

Aspect 14: The method of any of Aspects 1-13, wherein the perception information includes one or more of an image associated with an existing or upcoming blockage, a position associated with the existing or upcoming blockage, an orientation associated with the existing or upcoming blockage, a beam codebook associated with the existing or upcoming blockage, a message indicating the existing or upcoming blockage, a time of the existing or upcoming blockage, an expected extent of the existing or upcoming blockage, a duration of the existing or upcoming blockage, or one or more beams affected by the existing or upcoming blockage.

Aspect 15: The method of Aspect 14, further comprising using machine learning to predict the existing or upcoming blockage based at least in part on the perception information.

Aspect 16: The method of any of Aspects 1-13, wherein adjusting the parameter includes one or more of lowering a modulation and coding scheme, increasing a coding rate, widening a beam, selecting a beam codebook based at least in part on an existing or upcoming blockage, switching to another beam, adding a beam for measurement reporting, decreasing a quantity of layers, performing a handover, assigning a reference signal, or transmitting a new value for the parameter.

Aspect 17: The method of any of Aspects 1-16, wherein the perception information includes a location, pose, or orientation of the first device with respect to a reference point, an image associated with movement of the first device, a beam codebook associated with the movement of the first device, a position of the first device, a velocity of the movement of first device, or a beam pair to be used for the movement of the first device.

Aspect 18: The method of Aspect 17, further comprising using machine learning to predict the movement of the first device based at least in part on the perception information.

Aspect 19: The method of any of Aspects 1-18, wherein the perception information includes one or more of an image associated with an object in the environment, a location associated with the object, a location-based radio frequency measurement associated with the object, a distance of the object from the first device, a position of another object relative to a position of the object, or a beam codebook associated with locating the object.

Aspect 20: The method of Aspect 19, wherein generating the perception includes generating a radio frequency (RF) map that includes objects of the environment and beam directions.

Aspect 21: The method of Aspect 20, wherein generating the RF map includes using machine learning to generate the RF map.

Aspect 22: The method of any of Aspects 1-21, further comprising receiving, from a third device, additional perception information associated with one or more sensors of the third device, wherein generating the perception includes generating the perception based at least in part on the perception information from the second device and the additional perception information from the third device.

Aspect 23: The method of Aspect 22, wherein generating the perception includes using machine learning to generate the perception.

Aspect 24: The method of Aspect 22, wherein generating the perception includes using federated learning to generate the perception.

Aspect 25: A method of wireless communication performed by a second device, comprising: obtaining, from one or more sensors associated with the second device or one or more sensors associated with the second device, sensory information associated with an environment of a first device; generating perception information for the environment of the first device based at least in part on the sensory information, wherein the perception information is associated with characteristics of the environment; and transmitting the perception information to the first device.

Aspect 26: The method of Aspect 25, further comprising transmitting an indication of a perception capability of the second device.

Aspect 27: The method of Aspect 25 or 26, further comprising receiving, from the first device, a perception configuration that specifies the perception information that is to be obtained.

Aspect 28: The method of any of Aspects 25-27, wherein the perception information includes or is based at least in part on sensory information obtained from one or more sensors associated with the second device.

Aspect 29: The method of any of Aspects 25-28, wherein sensory information includes one or more of an image, a video, an inertial measurement, an orientation measurement, a barometric measurement, a magnetic compass direction, a proximity measurement, a radar measurement, or a lidar measurement.

Aspect 30: The method of any of Aspects 25-29, wherein the first device is a base station, and the second device is a user equipment.

Aspect 31: The method of any of Aspects 25-29, wherein the first device is a user equipment, and the second device is a base station.

Aspect 32: The method of any of Aspects 25-29, wherein the first device is a user equipment, and the second device is a user equipment.

Aspect 33: The method of any of Aspects 25-32, wherein the perception information includes one or more of an image associated with an existing or upcoming blockage, a position associated with the existing or upcoming blockage, an orientation associated with the existing or upcoming blockage, a beam codebook associated with the existing or upcoming blockage, a message indicating the existing or upcoming blockage, a time of the existing or upcoming blockage, an expected extent of the existing or upcoming blockage, a duration of the existing or upcoming blockage, or one or more beams affected by the existing or upcoming blockage.

Aspect 34: The method of Aspect 33, further comprising using machine learning to generate the perception information.

Aspect 35: The method of any of Aspects 25-34, wherein the perception information includes a location, pose, or orientation of the first device with respect to a reference point, an image associated with movement of the first device, a beam codebook associated with the movement of the first device, a position of the first device, a velocity of the movement of first device, or a beam pair to be used for the movement of the first device.

Aspect 36: The method of Aspect 35, further comprising using machine learning to predict the movement of the first device based at least in part on the perception information.

Aspect 37: The method of any of Aspects 25-34, wherein the perception information includes one or more of an image associated with an object in the environment, a location associated with the object, a location-based radio frequency measurement associated with the object, a distance of the object, a position of another object relative to a position of the object, or a beam codebook associated with locating the object.

Aspect 38: The method of Aspect 36, further comprising: generating a radio frequency (RF) map that includes objects of the environment and beam directions; and including the RF map in the perception information.

Aspect 39: The method of Aspect 38, wherein generating the RF map includes using machine learning to generate the RF map.

Aspect 40: An apparatus for wireless communication at a device, comprising a processor; memory coupled with the processor; and instructions stored in the memory and executable by the processor to cause the apparatus to perform the method of one or more of Aspects 1-39.

Aspect 41: A device for wireless communication, comprising a memory and one or more processors coupled to the memory, the one or more processors configured to perform the method of one or more of Aspects 1-39.

Aspect 42: An apparatus for wireless communication, comprising at least one means for performing the method of one or more of Aspects 1-39.

Aspect 43: A non-transitory computer-readable medium storing code for wireless communication, the code comprising instructions executable by a processor to perform the method of one or more of Aspects 1-39.

Aspect 44: A non-transitory computer-readable medium storing a set of instructions for wireless communication, the set of instructions comprising one or more instructions that, when executed by one or more processors of a device, cause the device to perform the method of one or more of Aspects 1-39.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The present disclosure also provides the following further embodiments:

Embodiment 1, which includes a first device for wireless communication, comprising: a memory; and one or more processors, coupled to the memory, configured to: obtain perception information for an environment of the first device; generate a perception associated with a communication by the first device based at least in part on the perception information, wherein the perception indicates characteristics of the environment; and adjust a parameter associated with the communication based at least in part on the perception.

Embodiment 2, which includes the first device of embodiment 1, wherein the one or more processors are configured to obtain the perception information by receiving the perception information from at least second device, in particular based at least in part on a perception capability of the second device.

Embodiment 3, which includes the first device of embodiment 2, wherein the one or more processors are configured to receive an indication of the perception capability of the second device.

Embodiment 4, which includes the first device of embodiment 2, wherein the one or more processors are configured to transmit, to the second device, a perception configuration that specifies the perception information that is to be obtained.

Embodiment 5, which includes the first device of any of the preceding embodiments, wherein the perception information includes or is based at least in part on sensory information obtained from one or more sensors of the at least one of the first device and the second device.

Embodiment 6, which includes the first device of any of the preceding embodiments, comprising at least one sensor for providing a perception information for the environment of the first device, in particular wherein the sensor is at least one of: an image sensor, a video camera, an inertial sensor, an orientation sensor, a barometric sensor, a magnetic compass direction sensor, a proximity sensor, a radar sensor, or a lidar sensor.

Embodiment 7, which includes the first device of embodiment 5, wherein the sensory information includes one or more of visual information, a video, an inertial measurement, an orientation measurement, a barometric measurement, a magnetic compass direction, a proximity measurement, a radar measurement, or a lidar measurement.

Embodiment 8, which includes first device of any of the preceding embodiments, wherein the perception includes one or more of an orientation, a velocity, a blockage proximity, a blockage timing, a blockage indication, a blockage duration, a signal fade due to blockage, a set of beams that are blocked, a new set of beams to be used, a location, an orientation, set of beams to use during motion, or a radio frequency map of the environment.

Embodiment 9, which includes the first device of any of the preceding embodiments, wherein the one or more processors, to generate the perception, are configured to: transmit sensory information to a processing entity; and receive perception information.

Embodiment 10, which includes the first device of any of the preceding embodiments, wherein the one or more processors, to adjust the parameter, are configured to: transmit information associated with the perception to a processing entity; and receive an adjustment to apply to the parameter.

Embodiment 11, which includes the first device of embodiment 10, wherein the one or more processors are configured to transmit an indication of the parameter to the processing entity.

Embodiment 12, which includes the first device of any of the preceding embodiments, wherein the parameter is for one or more of link adaptation, beam management, channel estimation, localization, handover, reference signal received power prediction, or roaming.

Embodiment 13, which includes the first device of embodiment 2, wherein the first device is a base station, and the second device is a user equipment.

Embodiment 14, which includes the first device of embodiment 2, wherein the first device is a user equipment, and the second device is a base station.

Embodiment 15, which includes the first device of embodiment 2, wherein the first device is a user equipment, and the second device is a user equipment.

Embodiment 16, which includes the first device of any of the preceding embodiments, wherein the perception information includes one or more of visual information associated with an existing or upcoming blockage, a position associated with the existing or upcoming blockage, an orientation associated with the existing or upcoming blockage, a beam codebook associated with the existing or upcoming blockage, a message indicating the existing or upcoming blockage, a time of the existing or upcoming blockage, an expected extent of the existing or upcoming blockage, a duration of the existing or upcoming blockage, or one or more beams affected by the existing or upcoming blockage.

Embodiment 17, which includes the first device of embodiment 16, wherein the one or more processors are configured to predict the upcoming blockage based at least in part on the perception information, in particular by using machine learning.

Embodiment 18, which includes the first device of any of the preceding embodiments, wherein the one or more processors, to adjust the parameter, are configured to lower a modulation and coding scheme, increase a coding rate, widen a beam, select a beam codebook based at least in part on an existing or upcoming blockage, switch to another beam, add a beam for measurement reporting, decrease a quantity of layers, perform a handover, assign a reference signal, or transmit a new value for the parameter.

Embodiment 19, which includes the first device of any of the preceding embodiments, wherein the perception information includes a location, pose, or orientation of the first device with respect to a reference point, visual information associated with movement of the first device, a beam codebook associated with the movement of the first device, a position of the first device, a velocity of the movement of first device, or a beam pair to be used for the movement of the first device.

Embodiment 20, which includes the first device of embodiment 19, wherein the one or more processors are configured to use machine learning to predict the movement of the first device based at least in part on the perception information, in particular by using machine learning.

Embodiment 21, which includes the first device of any of the preceding embodiments, wherein the perception information includes one or more of visual information associated with an object in the environment, a location associated with the object, a location-based radio frequency measurement associated with the object, a distance of the object, a position of another object relative to a position of the object, or a beam codebook associated with the object.

Embodiment 22, which includes the first device of embodiment 21, wherein the one or more processors, to generate the perception, are configured to generate a radio frequency (RF) map that includes objects of the environment and beam directions.

Embodiment 23, which includes the first device of embodiment 22, wherein the one or more processors, to generate the RF map, are configured to use machine learning to generate the RF map.

Embodiment 24, which includes the first device of any of the preceding embodiments, wherein the one or more processors are configured to receive, from a third device, additional perception information associated with one or more sensors of the third device, wherein the one or more processors, to generate the perception, are configured to generate the perception based at least in part on the perception information from the second device and the additional perception information from the third device.

Embodiment 25, which includes the first device of embodiment 24, wherein the one or more processors, to generate the perception, are configured to use machine learning to generate the perception.

Embodiment 26, which includes the first device of embodiment 24, wherein the one or more processors, to generate the perception, are configured to use federated learning to generate the perception.

Embodiment 27, which includes the first device of any of the preceding embodiments, wherein the wireless device is configured to perform a discovery procedure to discover a second device offering perception information.

Embodiment 28, which includes a second device for wireless communication, comprising: a memory; and one or more processors, coupled to the memory, configured to: obtain, from one or more sensors of the second device or one or more sensors communicatively coupled with the second device, sensory information associated with an environment of a first device; generate perception information for the environment of the first device based at least in part on the sensory information, wherein the perception information is associated with characteristics of the environment; and transmit the perception information to the first device.

Embodiment 29, which includes the second device of embodiment 28, wherein the one or more processors are configured to transmit an indication of a perception capability of the second device.

Embodiment 30, which includes the second device of embodiment 28 or 29, wherein the perception information includes sensory information obtained from at least of: one or more sensors of the second device, or one or more sensors communicatively coupled with the second device.

Embodiment 31, which includes the second device of any of the preceding embodiments 28 to 30, wherein the one or more processors are configured to use machine learning to generate the perception information.

Embodiment 32, which includes the second device of any of the preceding embodiments 28 to 31, wherein the one or more processors are configured to use machine learning to predict movement of the first device based at least in part on the perception information.

Embodiment 33, which includes the second device of any of the preceding embodiments 28 to 32, wherein the one or more processors are configured to: generate a radio frequency (RF) map that includes objects of the environment and beam directions, wherein the one or more processors, to generate the RF map, are configured to use machine learning to generate the RF map; and include the RF map in the perception information.

Embodiment 34, which includes the second device of any of the preceding embodiments 28 to 33, wherein the second device is configured to advertise its capability of offering perception information to other devices.

Embodiment 35, which includes a method for wireless communication, performed by a first device and comprising: obtaining perception information for an environment of the first device; generating a perception associated with a communication by the first device based at least in part on the perception information, wherein the perception indicates characteristics of the environment; and adjusting a parameter associated with the communication based at least in part on the perception.

Embodiment 36, which includes the method of embodiment 35, comprising obtaining the perception information by receiving the perception information from at least second device, in particular based at least in part on a perception capability of the second device.

Embodiment 37, which includes the method of embodiment 36, comprising receiving an indication of the perception capability of the second device.

Embodiment 38, which includes the method of embodiment 36, comprising transmitting, to the second device, a perception configuration that specifies the perception information that is to be obtained.

Embodiment 39, which includes the method of any of the preceding embodiments 35 to 38, wherein the perception information includes or is based at least in part on sensory information obtained from at least of one or more sensors of the first or one or more sensors of the second device.

Embodiment 40, which includes the method of any of the preceding embodiments 35 to 39, wherein the first device comprises at least one sensor for providing a perception information for the environment of the first device, in particular wherein the sensor is at least one of: an image sensor, a video camera, an inertial sensor, an orientation sensor, a barometric sensor, a magnetic compass direction sensor, a proximity sensor, a radar sensor, or a lidar sensor.

Embodiment 41, which includes the method of embodiment 39, wherein the sensory information includes one or more of visual information, a video, an inertial measurement, an orientation measurement, a barometric measurement, a magnetic compass direction, a proximity measurement, a radar measurement, or a lidar measurement.

Embodiment 42, which includes the method of any of the preceding embodiments 35 to 41, wherein the perception includes one or more of an orientation, a velocity, a blockage proximity, a blockage timing, a blockage indication, a blockage duration, a signal fade due to blockage, a set of beams that are blocked, a new set of beams to be used, a location, an orientation, set of beams to use during motion, or a radio frequency map of the environment.

Embodiment 43, which includes the method of any of the preceding embodiments 35 to 42, comprising: transmitting sensory information to a processing entity; and receiving perception information.

Embodiment 44, which includes the method of any of the preceding embodiments 35 to 43, comprising: transmitting information associated with the perception to a processing entity; and receiving an adjustment to apply to the parameter.

Embodiment 45, which includes the method of embodiment 44, comprising transmitting an indication of the parameter to the processing entity.

Embodiment 46, which includes the method of any of the preceding embodiments 35 to 45, wherein the parameter is for one or more of link adaptation, beam management, channel estimation, localization, handover, reference signal received power prediction, or roaming.

Embodiment 47, which includes the method of embodiment 36, wherein the first device is a base station, and the second device is a user equipment.

Embodiment 48, which includes the method of embodiment 36, wherein the first device is a user equipment, and the second device is a base station.

Embodiment 49, which includes the method of embodiment 36, wherein the first device is a user equipment, and the second device is a user equipment.

Embodiment 50, which includes the method of any of the preceding embodiments 35 to 49, wherein the perception information includes one or more of visual information associated with an existing or upcoming blockage, a position associated with the existing or upcoming blockage, an orientation associated with the existing or upcoming blockage, a beam codebook associated with the existing or upcoming blockage, a message indicating the existing or upcoming blockage, a time of the existing or upcoming blockage, an expected extent of the existing or upcoming blockage, a duration of the existing or upcoming blockage, or one or more beams affected by the existing or upcoming blockage.

Embodiment 51, which includes the method of embodiment 50, comprising predicting the upcoming blockage based at least in part on the perception information, in particular by using machine learning.

Embodiment 52, which includes the method of any of the preceding embodiments 35 to 51, comprising lowering a modulation and coding scheme, increasing a coding rate, widening a beam, selecting a beam codebook based at least in part on an existing or upcoming blockage, switching to another beam, adding a beam for measurement reporting, decreasing a quantity of layers, performing a handover, assign a reference signal, or transmitting a new value for the parameter.

Embodiment 53, which includes the method of any of the preceding embodiments 35 to 52, wherein the perception information includes a location, pose, or orientation of the first device with respect to a reference point, visual information associated with movement of the first device, a beam codebook associated with the movement of the first device, a position of the first device, a velocity of the movement of first device, or a beam pair to be used for the movement of the first device.

Embodiment 54, which includes the method of embodiment 53, comprising predicting the movement of the first device based at least in part on the perception information, in particular by using machine learning.

Embodiment 55, which includes the method of any of the preceding embodiments 35 to 54, wherein the perception information includes one or more of visual information associated with an object in the environment, a location associated with the object, a location-based radio frequency measurement associated with the object, a distance of the object, a position of another object relative to a position of the object, or a beam codebook associated with the object.

Embodiment 56, which includes the method of embodiment 55, comprising generating a radio frequency (RF) map that includes objects of the environment and beam directions.

Embodiment 57, which includes the method of embodiment 56, comprising using machine learning to generate the RF map.

Embodiment 58, which includes the method of any of the preceding embodiments 35 to 57, comprising receiving, from a third device, additional perception information associated with one or more sensors of the third device, wherein the one or more processors, to generate the perception, are configured to generate the perception based at least in part on the perception information from the second device and the additional perception information from the third device.

Embodiment 59, which includes the method of embodiment 58, comprising using machine learning to generate the perception.

Embodiment 60, which includes the method of embodiment 58, comprising using federated learning to generate the perception.

Embodiment 61, which includes the method of any of the preceding embodiments 35 to 60, comprising performing a discovery procedure to discover a second device offering perception information.

Embodiment 62, which includes the method for wireless communication, performed by a second device and comprising: obtaining, from one or more sensors of the second device or one or more sensors communicatively coupled with the second device, sensory information associated with an environment of a first device; generating perception information for the environment of the first device based at least in part on the sensory information, wherein the perception information is associated with characteristics of the environment; and transmitting the perception information to the first device.

Embodiment 63, which includes the method of embodiment 62, comprising transmitting an indication of a perception capability of the second device.

Embodiment 64, which includes the method of embodiment 62 or 63, wherein the perception information includes sensory information obtained from at least one of: one or more sensors of the second device or one or more sensors communicatively coupled with the second device.

Embodiment 65, which includes the method of any of the preceding embodiments 62 to 64, comprising using machine learning to generate the perception information.

Embodiment 66, which includes the method of any of the preceding embodiments 62 to 65, comprising using machine learning to predict movement of the first device based at least in part on the perception information.

Embodiment 67, which includes the method of any of the preceding embodiments 62 to 66, comprising: generating a radio frequency (RF) map that includes objects of the environment and beam directions, wherein the one or more processors, to generate the RF map, are configured to use machine learning to generate the RF map; and including the RF map in the perception information.

Embodiment 68, which includes the method of any of the preceding embodiments 62 to 67, comprising advertising the second device's capability of offering perception information to other devices.

Embodiment 69, which includes a computer program comprising instructions that, when executed on a processor, cause the processor to perform the method of any of the embodiments 35 to 68.

Embodiment 70, which includes a computer-readable medium storing instructions that, when executed on a processor, cause the processor to perform the method of any of the embodiments 35 to 68.

What is claimed is:

1. A first device for wireless communication, comprising:
   one or more memories; and
   one or more processors, coupled to the one or more memories, individually or collectively configured to cause the first device to:
   receive, via control signaling, an indication of a perception capability of a second device;
   receive, from the second device, perception information for an environment of the first device based at least in part on the perception capability of the second device;
   generate a perception associated with a communication by the first device based at least in part on the perception information from the second device, wherein the perception indicates characteristics of the environment; and
   adjust a parameter associated with the communication based at least in part on the perception, wherein the one or more processors, to cause the first device to adjust the parameter, are configured to cause the first device to lower a modulation and coding scheme, increase a coding rate, widen a beam, select a beam codebook based at least in part on an existing or upcoming blockage, switch to another beam, add a beam for measurement reporting, decrease a quantity of layers, perform a handover, assign a reference signal, transmit a new value for the parameter, or any combination thereof.

2. The first device of claim 1, wherein the one or more processors are configured to cause the first device to transmit, to the second device, a perception configuration that specifies the perception information that is to be obtained.

3. The first device of claim 1, wherein the perception information includes or is based at least in part on sensory information obtained from one or more sensors of the second device.

4. The first device of claim 3, wherein the sensory information includes one or more of visual information, a video, an inertial measurement, an orientation measurement, a barometric measurement, a magnetic compass direction, a proximity measurement, a radar measurement, or a lidar measurement.

5. The first device of claim 1, wherein the perception includes one or more of an orientation, a velocity, a blockage proximity, a blockage timing, a blockage indication, a blockage duration, a signal fade due to blockage, a set of beams that are blocked, a new set of beams to be used, a location of the first device or the second device, a set of beams to use during motion, or a radio frequency map of the environment.

6. The first device of claim 1, wherein the one or more processors, to cause the first device to generate the perception, are configured to cause the first device to:

transmit sensory information to a processing entity; and
receive the perception information.

7. The first device of claim 1, wherein the one or more processors, to cause the first device to adjust the parameter, are configured to cause the first device to:
transmit information associated with the perception to a processing entity; and
receive an adjustment to apply to the parameter.

8. The first device of claim 7, wherein the one or more processors are configured to cause the first device to transmit an indication of the parameter to the processing entity.

9. The first device of claim 1, wherein the parameter is for one or more of link adaptation, beam management, channel estimation, localization, the handover, reference signal received power prediction, or roaming.

10. The first device of claim 1, wherein the first device is a base station, and the second device is a user equipment.

11. The first device of claim 1, wherein the first device is a user equipment, and the second device is a base station.

12. The first device of claim 1, wherein the first device is a first user equipment, and the second device is a second user equipment.

13. The first device of claim 1, wherein the perception information includes one or more of visual information associated with the existing or upcoming blockage, a position associated with the existing or upcoming blockage, an orientation associated with the existing or upcoming blockage, the beam codebook, a message indicating the existing or upcoming blockage, a time of the existing or upcoming blockage, an expected extent of the existing or upcoming blockage, a duration of the existing or upcoming blockage, or one or more beams affected by the existing or upcoming blockage.

14. The first device of claim 13, wherein the one or more processors are configured to cause the first device to use machine learning to predict the upcoming blockage based at least in part on the perception information.

15. The first device of claim 1, wherein the perception information includes a location, pose, or orientation of the first device with respect to a reference point, visual information associated with movement of the first device, a beam codebook associated with the movement of the first device, a position of the first device, a velocity of the movement of the first device, or a beam pair to be used for the movement of the first device.

16. The first device of claim 15, wherein the one or more processors are configured to cause the first device to use machine learning to predict the movement of the first device based at least in part on the perception information.

17. The first device of claim 1, wherein the perception information includes one or more of visual information associated with an object in the environment, a location associated with the object, a location-based radio frequency measurement associated with the object, a distance of the object, from the first device, a position of another object relative to a position of the object, or a beam codebook associated with locating the object.

18. The first device of claim 17, wherein the one or more processors, to cause the first device to generate the perception, are configured to cause the first device to generate a radio frequency (RF) map that includes objects of the environment and beam directions.

19. The first device of claim 18, wherein the one or more processors, to cause the first device to generate the RF map, are configured to cause the first device to use machine learning to generate the RF map.

20. The first device of claim 1, wherein the one or more processors are configured to cause the first device to receive, from a third device, additional perception information associated with one or more sensors of the third device, wherein the one or more processors, to cause the first device to generate the perception, are configured to cause the first device to generate the perception based at least in part on the perception information from the second device and the additional perception information from the third device.

21. The first device of claim 20, wherein the one or more processors, to cause the first device to generate the perception, are configured to cause the first device to use machine learning to generate the perception.

22. The first device of claim 20, wherein the one or more processors, to cause the first device to generate the perception, are configured to cause the first device to use federated learning to generate the perception.

23. A second device for wireless communication, comprising:
one or more memories; and
one or more processors, coupled to the one or more memories, individually or collectively configured to cause the second device to:
transmit, via control signaling, an indication of a perception capability of the second device;
receive, from a first device, a perception configuration that specifies perception information that is to be obtained:
obtain, from one or more sensors of the second device or one or more sensors associated with the second device, sensory information associated with an environment of the first device;
generate the perception information based at least in part on the sensory information, wherein the perception information is for the environment of the first device and associated with characteristics of the environment; and
transmit the perception information to the first device.

24. The second device of claim 23, wherein the perception information includes or is based at least in part on the sensory information.

25. The second device of claim 23, wherein the one or more processors are configured to cause the second device to use machine learning to generate the perception information.

26. The second device of claim 23, wherein the one or more processors are configured to cause the second device to use machine learning to predict movement of the first device based at least in part on the perception information.

27. The second device of claim 23, wherein the one or more processors are configured to cause the second device to:
generate a radio frequency (RF) map that includes objects of the environment and beam directions, wherein the one or more processors, to cause the second device to generate the RF map, are configured to cause the second device to use machine learning to generate the RF map; and
include the RF map in the perception information.

28. The second device of claim 23, wherein the sensory information includes one or more of an image, a video, an inertial measurement, an orientation measurement, a barometric measurement, a magnetic compass direction, a proximity measurement, a radar measurement, or a lidar measurement.

29. The second device of claim 23, wherein the first device is a base station, and the second device is a user equipment.

30. The second device of claim 23, wherein the first device is a user equipment, and the second device is a base station.

* * * * *